US012694077B1

(12) United States Patent
Zhang et al.

(10) Patent No.: US 12,694,077 B1
(45) Date of Patent: Jul. 28, 2026

(54) NSCT-UPEMD-PHT BASED ROBUST ZERO-WATERMARKING ALGORITHM AND SYSTEM

(71) Applicant: QIQIHAR UNIVERSITY, Qiqihar City (CN)

(72) Inventors: Guangda Zhang, Qiqihar City (CN); Bo Yang, Qiqihar City (CN); He Liu, Qiqihar City (CN); Wenxin Deng, Qiqihar City (CN); Yichen Han, Qiqihar City (CN); Jingyou Li, Qiqihar City (CN); Haichuan Yu, Qiqihar City (CN); Zixin Yang, Qiqihar City (CN); Bangdong Wu, Qiqihar City (CN); Qingxue Jia, Qiqihar City (CN)

(73) Assignee: QIQIHAR UNIVERSITY, Qiqihar City (CN)

( * ) Notice: Subject to any disclaimer, the term of this patent is extended or adjusted under 35 U.S.C. 154(b) by 0 days.

(21) Appl. No.: 19/537,076

(22) Filed: Feb. 11, 2026

(30) Foreign Application Priority Data

Apr. 10, 2025 (CN) .......................... 202510445380.8

(51) Int. Cl.
G06F 21/10 (2013.01)
G06T 1/00 (2006.01)
(Continued)

(52) U.S. Cl.
CPC ............ G06F 21/10 (2013.01); G06T 1/0021 (2013.01); G06T 1/005 (2013.01);
(Continued)

(58) Field of Classification Search
CPC ..... G06T 1/0021; G06T 1/005; G06T 1/0057; G06T 1/0064; G06T 1/0092;
(Continued)

(56) References Cited

U.S. PATENT DOCUMENTS

| | | | | |
|---|---|---|---|---|
| 2003/0123698 A1* | 7/2003 | Murakami | ........... | H04N 1/3216 |
| | | | | 382/280 |
| 2004/0091050 A1* | 5/2004 | Choi | ....................... | G06T 1/005 |
| | | | | 375/240.18 |
| 2007/0140523 A1* | 6/2007 | Parisis | .................. | G06T 1/0028 |
| | | | | 382/100 |

FOREIGN PATENT DOCUMENTS

| | | | | | |
|---|---|---|---|---|---|
| CN | 114742687 A | * | 7/2022 | .......... | G06T 1/0021 |
| CN | 116012210 A | * | 4/2023 | | |
| CN | 116645259 A | * | 8/2023 | .......... | G06T 1/0021 |

OTHER PUBLICATIONS

Chen C, Liu J, Sun J, Ren Z, Hu H. A robust watermarking scheme based on non-subsampled contourlet transform. In2010 8th World Congress on Intelligent Control and Automation Jul. 7, 2010 (pp. 1022-1026). IEEE. (Year: 2010).*

(Continued)

*Primary Examiner* — Oneal R Mistry
*Assistant Examiner* — Duy Tran
(74) *Attorney, Agent, or Firm* — HoustonHogle LLP

(57) ABSTRACT

A non-subsampled contourlet transform (NSCT)-uniform phase empirical mode decomposition (UPEMD)-polar harmonic transform (PHT) based robust zero-watermarking algorithm is provided, including the following steps: step 1: encryption on a watermark image through a Tent map; step 2: watermark embedding; step 3: watermark extraction; and step 4: decryption on the watermark image. Before embedded into a host image, the watermark image is encrypted based on the Tent map, ensuring the security of the watermark. The NSCT is performed on a host image, low-frequency information is extracted, and the UPEMD and the PHT are performed on the low-frequency information, thereby realizing the watermark embedding. This application organically combines the chaotic map algorithm and the (Continued)

novel watermarking technique, realizing the method of embedding a digital zero-watermark into a digital image.

15 Claims, 7 Drawing Sheets

(51) Int. Cl.
  *H04N 1/32*      (2006.01)
  *H04N 21/2389*   (2011.01)
(52) U.S. Cl.
  CPC ..... *H04N 1/32154* (2013.01); *H04N 1/32352* (2013.01); *H04N 21/23892* (2013.01)
(58) Field of Classification Search
  CPC ....... G06T 2201/005; G06T 2201/0053; G06T 2201/0061; G06T 2201/0202; G06T 2201/0203; G06T 2201/0601; G06T 2201/0065; G06T 2201/0064; G06T 2201/0052; G06F 21/10; G06F 3/1242; G06F 3/1243; G06F 21/16; G06F 3/1415; G06F 2212/455; H04N 1/32149; H04N 1/32154; H04N 1/3232; H04N 1/32347; H04N 1/3235; H04N 21/23892; H04N 21/8358; H04N 2201/3233; H04N 7/127; H04N 5/92; H04N 13/111; H04N 19/12; H04N 19/122
  See application file for complete search history.

(56) References Cited

OTHER PUBLICATIONS

Bouarroudj R, Souami F, Bellala FZ. Fragile watermarking for medical image authentication based on DCT technique. In2023 5th International Conference on Pattern Analysis and Intelligent Systems (PAIS) Oct. 25, 2023 (pp. 1-6). IEEE. (Year: 2023).*

* cited by examiner

NSCT-UPEMD-PHT BASED ROBUST ZERO-WATERMARKING ALGORITHM AND SYSTEM

CROSS REFERENCE TO RELATED APPLICATION

This patent application claims the benefit and priority of Chinese Patent Application No. 2025104453808, filed with the China National Intellectual Property Administration on Apr. 10, 2025, the disclosure of which is incorporated by reference herein in its entirety as part of the present application.

TECHNICAL FIELD

The present disclosure belongs to the technical field of information security, relates to a robust zero-watermarking algorithm, and particularly relates to a robust zero-watermarking algorithm based on polar harmonic transform (PHT), non-subsampled contourlet transform (NSCT), uniform phase empirical mode decomposition (UPEMD), and a Hilbert curve.

BACKGROUND

Currently, with the rapid advancement of information digitization, massive amounts of information are transmitted and stored over the Internet, allowing people to access information from around the world more quickly and conveniently. However, lurking behind the convenience brought by such rapid technical advancements is a more serious crisis: A growing number of people are leveraging these techniques to plagiarize intellectual property and steal information. To address this challenge, digital watermarking techniques have been introduced. In medical applications, copyright protection of medical images imposes stricter requirements on watermarking technology. Medical images (such as Computed Tomography (CT), Magnetic Resonance Imaging (MRI), X-ray, and pathological images) hold irreplaceable value in clinical diagnosis and medical research; even minute changes in pixel information may influence a judgment of a physician. Because conventional watermarking inevitably alters the original pixel values, it cannot be directly applied to medical scenarios. Zero-watermarking, which leaves the original image intact and binds copyright information with stable features of the original image, has thus become a focal point of research for protecting medical-image copyrights.

However, for zero-watermarked images, unauthorized abuse of images still occurs; owners of the images are often unable to prove the copyright ownership of the images, resulting in the inability to protect their rights.

SUMMARY

An objective of the present disclosure is to provide an NSCT-UPEMD-PHT based robust zero-watermarking algorithm and a system. The present disclosure employs the UPEMD to extract a more stable mode. While maintaining high robustness against common attacks, the present disclosure also incorporates the NSCT and the PHT to enhance the robustness of the algorithm. The PHT makes use of a polar coordinate domain to process the mode, improving the robustness against geometric attacks. The robustness is evaluated by a normalized correlation (NC) and a bit error rate (BER).

The computer-implemented copyright protection method provided in the embodiment of the present application includes:

obtaining a first image to be subjected to copyright verification;

extracting watermark from the first image, including:

step 1: performing full-scale non-subsampled contourlet transform (NSCT) on the first image I(i, j) to obtain one first low-frequency sub-band and four first high-frequency sub-bands, I representing the first image;

step 2: performing Hilbert-curve dimensionality reduction on the first low-frequency sub-band to obtain a first one dimensional (1D) low-frequency sub-band;

step 3: for the first 1D low-frequency sub-band, decomposing a signal S'(t) of the first 1D low-frequency sub-band into different bands with wavelet packet decomposition (WPD), each band carrying a signal component, and determining a last intrinsic mode of the first 1D low-frequency sub-band after WPD; wherein the last intrinsic mode of the first 1D low-frequency sub-band after WPD is the fifth mode that is the most stable intrinsic mode;

step 4: performing inverse Hilbert-curve dimensionality augmentation on the last intrinsic mode of the first 1D low-frequency sub-band after WPD, subjecting to a polar coordinate domain transformation and extracting values in a unit circle to obtain a modal matrix X';

step 5: performing a polar harmonic transform (PHT) on the modal matrix X' to obtain a first PHT moment, and performing following calculation on the first PHT moment:

$$Y'_j = \sum_{i+3}^{i} X'_i + N$$

wherein $Y'_j$ is a processed PHT value, $X'_i$ is an original value of an element of the first PHT moment, and N is initially 45; and step 6: subjecting a first processed PHT moment Y'(i, j) to mean normalization, followed by XORing with a stored key $W_y(i, j)$ to obtain an encrypted watermark;

performing watermark decryption, including: XORing a stored decryption key $W_0$ and the encrypted watermark obtained in the step 6 to a first watermark image;

comparing the first watermark image with a second watermark image stored and containing copyright information;

in response to a comparison result indicating that the first watermark image and the second watermark image are identical, determining that a copyright of the first image is legal.

In an embodiment, the decryption key $W_0$ is obtained by following steps:

generating a chaotic sequence from an initial value α; and followed by binarizing as X(j),X(j)|X(j)=1, 0;

storing X(j),X(j)|X(j)=1,0 as a decryption key $W_0$.

In an embodiment, the key $W_y(i, j)$ is obtained by following steps:

receiving the second watermark image containing the copyright information input by a user;

performing encryption on the second watermark image W(i, j) through a Tent map, including: XORing X(j), X(j)|X(j)=1,0 and the second watermark image to obtain an encrypted second watermark image $W_e(i, j)$;

performing watermark embedding, including:

step 1: performing the full-scale NSCT on a second image I(i, j) input by the user to be subjected to copyright protection, to obtain one second low-frequency sub-band and four second high-frequency sub-bands, I representing the second image;

step 2: performing the Hilbert-curve dimensionality reduction on the second low-frequency sub-band to obtain a second one-dimensional (1D) low-frequency sub-band;

step 3: for the second 1D low-frequency sub-band, decomposing a signal S(t) of the second 1D low-frequency sub-band into different bands with the WPD, each band carrying a signal component, and determining a last intrinsic mode of the second 1D low-frequency sub-band after WPD; wherein the last intrinsic mode of the second 1D low-frequency sub-band after WPD is the fifth mode that is the most stable intrinsic mode;

step 4: performing the inverse Hilbert-curve dimensionality augmentation on the last intrinsic mode of the second 1D low-frequency sub-band after WPD, subjecting to a polar coordinate domain transformation and extracting values in a unit circle to obtain a modal matrix X;

step 5: performing the PHT on the modal matrix X to obtain a second PHT moment, and performing following calculation on the second PHT moment:

$$Y_j = \sum_{i+3}^{i} X_i + N$$

wherein $Y_i$ is a processed PHT value, and $X_i$ is an original value of an element of the second PHT moment; and step 6: subjecting a second processed PHT moment Y(i, j) to the mean normalization, followed by XORing with the encrypted second watermark image $W_e(i, j)$ to obtain the key $W_y(i, j)$.

In an embodiment, the decryption key $W_0$, the key $W_y(i, j)$, and the second watermark image containing the copyright information are stored in a trustworthy third-party library, for subsequent copyright verification purposes.

Embodiments of the present application further provide a copyright protection device, including a processor and a memory storing instructions that, when executed by the processor, cause the copyright protection device to perform the computer-implemented copyright protection method according to the embodiments of the present application.

Embodiments of the present application further provide a non-transitory storage medium storing instructions that, when executed, cause a computer to perform the computer-implemented copyright protection method according to the embodiments of the present application.

In a specific application scenario, the user can perform steps of encryption and the watermark-embedding on the second watermark image to establish a correlation between the second watermark image that represents copyright information and the features extracted from the image requiring copyright protection, thereby completing an implicit annotation of the copyright information within the image requiring copyright protection. Because the NSCT and UPEMD are employed during watermark embedding, the features extracted from the image requiring copyright protection exhibit strong stability. Moreover, PHT is used during watermark embedding, this may capture rotation-invariant feature and thus enhancing resistance to rotation attacks; consequently, the extracted features show strong robustness against noise attacks. When the extracted features (i.e., the PHT moment after the mean normalization) are XORed with the encrypted second watermark image to obtain the key $W_y(i, j)$, and the key $W_y(i, j)$ represents a correlation between the noise-robust features and the second watermark image, ensuring that even if the image requiring copyright protection contains substantial noise, the impact of that noise on the key $W_y(i, j)$ is negligible. Additionally, the decryption key $W_0$, the key $W_y(i, j)$ and the second watermark image representing the copyright information can be stored in a trustworthy third-party repository for subsequent copyright verification.

In another specific application scenario, to determine whether an image is copyrighted or whether its use has been authorized by the owner, the watermark extraction and watermark-decryption steps described above are applied to the image to be subjected to copyright verification to obtain a first watermark image representing the original watermark information. This first watermark image is then compared with the stored second watermark image that represents the copyright information. The use of NSCT, UPEMD, and PHT during feature extraction ensures that, even if the image has been significantly altered (e.g., various types of noise have been added), the extracted first watermark image remains identical to the stored second watermark image. If the comparison result shows that the first watermark image and the second watermark image match, the image to be subjected to copyright verification is deemed copyright-compliant, and a corresponding copyright-ownership certificate is generated as evidence for copyright authentication and forensics. Conversely, if the comparison result indicates that the first watermark image differs from the second watermark image stored in the trustworthy third-party library, the image to be subjected to copyright verification is identified as pirated, enabling legal action against the party misusing the image to be subjected to copyright verification.

For a system that performs the above watermark encryption, watermark embedding, watermark extraction, and watermark decryption (i.e., a watermarking system), an image to be subjected to copyright protection can be processed as follows:

step 1: according to a user requirement, generating a watermark image or reading a watermark image uploaded by a user; wherein the watermark image represents copyright information;

step 2: reading a host image uploaded by the user (i.e., the image to be subjected to copyright protection), executing the watermark encryption and watermark embedding, and storing a zero-watermark key (i.e., the decryption key $W_0$, the key $W_y(i, j)$); and step 3: storing the zero-watermark key and the watermark image to a trustworthy third-party library, and returning a key number to the user for use in copyright protection; for example, generating a tamper-proof copyright deposit record and storing a key copy in association with account of the user for subsequent copyright verification.

The objective of the present disclosure may also be achieved by the following technical solutions:

An NSCT-UPEMD-PHT based robust zero-watermarking algorithm and a system include the following steps:

(1) Encryption on a Watermark Image W(i, j) Through a Tent Map:

generating a chaotic sequence from an initial value α, followed by binarizing as (X(j),X(j)|X(j)=1,0), and XORing with the watermark image, storing $W_0$ as a decryption key for encrypting the watermark image, and obtaining an encrypted watermark image $W_e(i, j)$;

(2) Watermark Embedding:

substep 1: performing full-scale NSCT on a host image I(i, j) to obtain one low-frequency sub-band and four high-frequency sub-bands, I representing the host image;

substep 2: performing Hilbert-curve dimensionality reduction on the low-frequency sub-band to obtain a 1D low-frequency sub-band;

substep 3: for the 1D low-frequency sub-band, decomposing a signal S(t) into different bands with wavelet packet decomposition (WPD), each band carrying a signal component, and selecting a fifth mode that is most stable;

substep 4: performing inverse Hilbert-curve dimensionality augmentation on the fifth mode, processing the fifth mode with a polar coordinate domain, and taking values in a unit circle;

substep 5: performing PHT on a processed fifth mode to obtain a PHT moment, and performing the following calculation:

$$Y_j = \sum_{i+3}^{i} X_i + N$$

where $Y_j$ is a processed PHT value, and $X_i$ is an original value; and substep 6: subjecting a processed PHT moment Y(i, j) to mean normalization, followed by XORing with the encrypted watermark image $W_e(i, j)$ to obtain a key $W_y(i, j)$;

(3) Watermark Extraction:

substep 1: performing the full-scale NSCT on a host image I(i, j) to obtain one low-frequency sub-band and four high-frequency sub-bands, I representing the host image;

substep 2: performing the Hilbert-curve dimensionality reduction on the low-frequency sub-band to obtain a 1D low-frequency sub-band;

substep 3: for the 1D low-frequency sub-band, decomposing a signal S'(t) into different bands with the WPD, each band carrying a signal component, and selecting a fifth mode that is most stable;

substep 4: performing the inverse Hilbert-curve dimensionality augmentation on the fifth mode, processing the fifth mode with a polar coordinate domain, and taking values in a unit circle;

substep 5: performing PHT on a processed fifth mode to obtain a PHT moment, and performing the following calculation:

$$Y'_j = \sum_{i+3}^{i} X'_i + N$$

where $Y'_j$ is a processed PHT value, and $X'_i$ is an original value; and substep 6: subjecting a processed PHT moment Y'(i, j) to the mean normalization, followed by XORing with the key $W_y(i, j)$ to obtain an encrypted watermark;

(4) Watermark Decryption:

XORing the decryption key $W_0$ obtained in an encryption and the encrypted watermark obtained in the substep 6 of the step (3) to obtain original watermark information; and (5) a Watermarking System Configured to Implement the Following Steps:

step 1: according to a user requirement, generating a watermark image or reading a watermark image uploaded by a user;

step 2: reading a host image uploaded by the user, executing the above steps 1-4, and storing a zero-watermark key; and step 3: storing the zero-watermark key to a trustworthy third-party library, and returning a key number to the user for use in copyright protection.

Compared with the prior art, the present disclosure has the following advantages:

Experimental results show that the robust watermarking algorithm provided by the present disclosure exhibits better performance than the existing watermarking algorithm in more complex situations, particularly in noise attacks and filtering attacks, and has excellent robustness.

BRIEF DESCRIPTION OF THE DRAWINGS

FIG. 2A is a thoracic computerized tomography (CT) image, and FIG. 2B is a brain CT image;

FIG. 5A illustrates Gaussian noise, FIG. 5B illustrates salt & pepper noise, FIG. 5C illustrates JPEG compression, FIG. 5D illustrates median filtering, FIG. 5E illustrates mean filtering, FIG. 5F illustrates Gaussian low-pass filtering, FIG. 5G illustrates rotation, and FIG. 5H illustrates cropping; FIG. 6A illustrates Gaussian noise, FIG. 6B illustrates salt & pepper noise, FIG. 6C illustrates JPEG compression, FIG. 6D illustrates median filtering, FIG. 6E illustrates mean filtering, FIG. 6F illustrates Gaussian low-pass filtering, FIG. 6G illustrates rotation, and FIG. 6H illustrates cropping.

DETAILED DESCRIPTION OF THE EMBODIMENTS

The technical solutions in the present disclosure are described in further detail below with reference to accompanying drawings, but the present disclosure is not limited thereto. Any modification or equivalent replacement to the technical solutions of the present disclosure made without departing from the spirit and scope of the technical solutions of the present disclosure should fall within the protection scope of the present disclosure.

Currently, despite being a prevalent decomposition technique, Empirical Mode Decomposition (EMD) has seen relatively limited application in watermarking algorithms. Hu et al. proposed a robust and efficient image watermarking algorithm based on a Hilbert curve and one-dimensional (1D) EMD. This algorithm is mainly intended to convert a two-dimensional (2D) problem into a 1D one with the Hilbert curve to enhance efficiency, and then employ repeated embedding strategy to enhance robustness, but repeated embedding strategy causes significant damage to image pixels. Mohammad et al. proposed an EMD-based reversible data hiding technique (DHT) using dual images. This algorithm exploits the modification direction (EMD) based DHT to provide moderate data hiding capacity and high-quality stego images.

Figure 1:
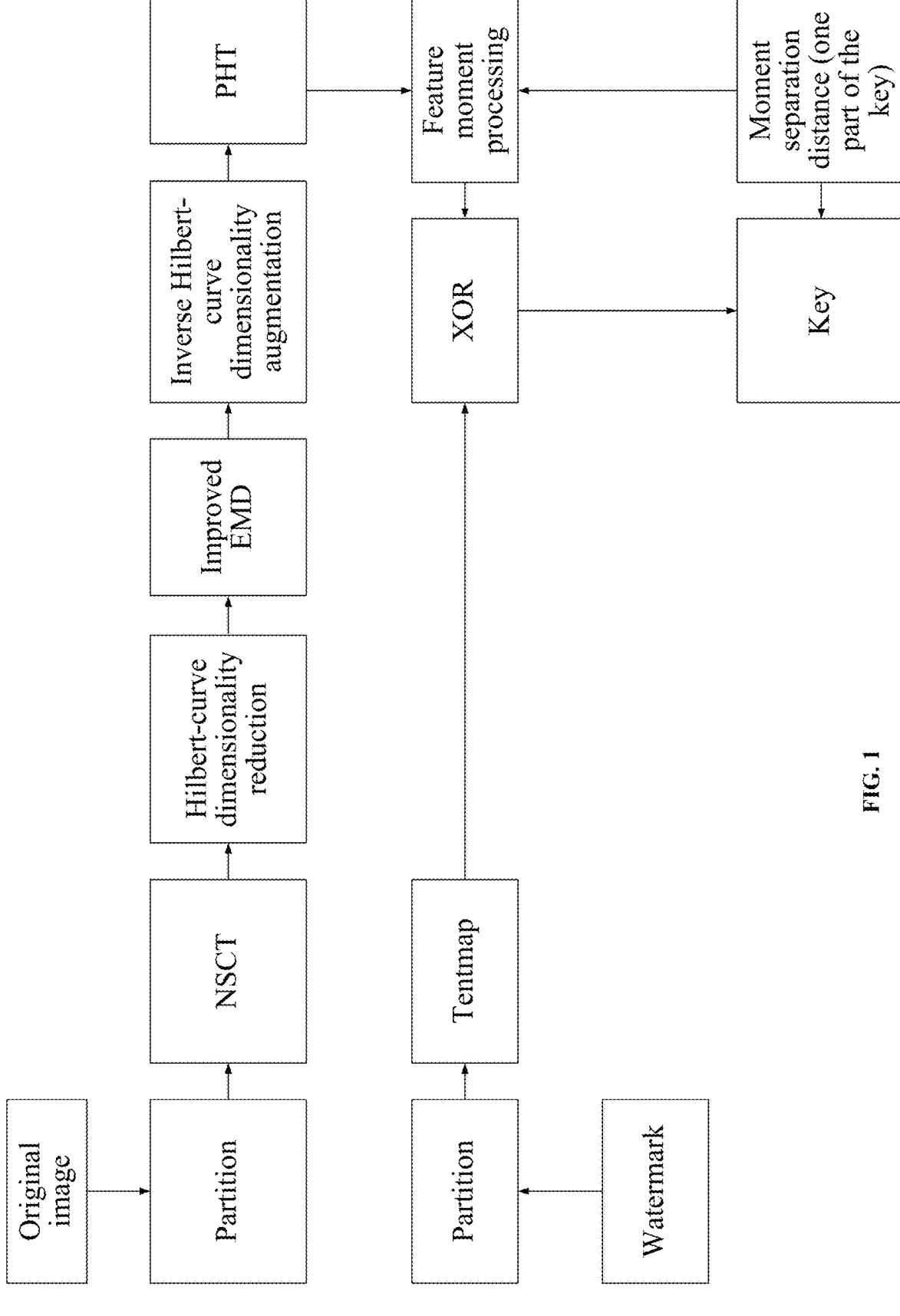
FIG. 1 is a flowchart of watermarking.
Figure 2A:
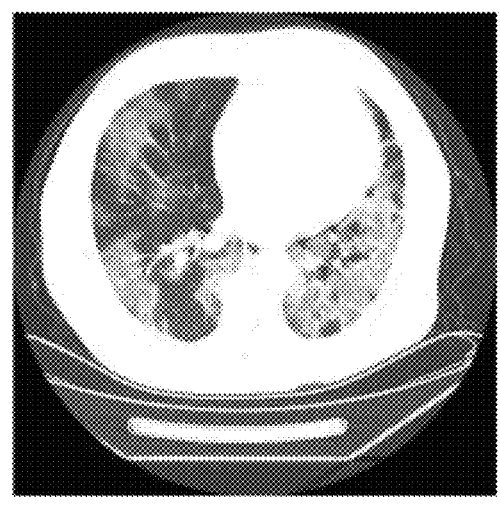
FIGS. 2A-2B illustrate original host images.
Figure 2B:
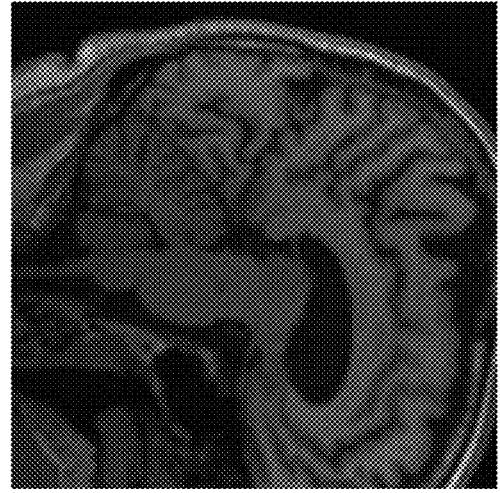
Figure 3:
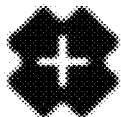
FIG. 3 illustrates an original watermark image.

The present disclosure provides an NSCT-UPEMD-PHT based robust zero-watermarking algorithm and a system. The system includes a memory, a processor, and a computer program stored in the memory. The computer program is executed by the processor to realize copyright protection. With a Tent map on a binary watermark image, the watermark image is encrypted. NSCT is performed on a host image, UPEMD is performed on a decomposed low-frequency sub-band, and PHT is performed on a fifth mode to obtain a PHT moment. A processed PHT moment is subjected to mean normalization and XORed with an encrypted watermark image to obtain a key, thereby completing watermark embedding. The algorithm mainly includes four parts: watermark encryption, watermark embedding, watermark extraction, and watermark decryption. The watermark embedding and the watermark extraction are largely similar. As shown in FIG. 1, the algorithm specifically includes the following steps:

(1) Encryption on a Watermark Image W(i, j) Through a Tent Map:

A chaotic sequence is generated from an initial value $\alpha$, binarized as X(j), X(j)|X(j)=1,0, and XORed with the watermark image. $W_0$ is stored as a decryption key for encrypting the watermark image, and an encrypted watermark image $W_e(i, j)$ is obtained, thereby enhancing the security of the watermark image.

(2) Watermark Embedding:

Substep 1: A host image is read, and an appropriate channel is selected from three channels according to image features. Most images are still color images according to actual data, even if they appear black and white. They are still processed by different channels.

Substep 2: NSCT is performed on a selected channel. A low-frequency domain is selected, and transformed into 1D data through a Hilbert curve for the convenience of processing. Through dimensionality reduction, the calculation burden for data can be reduced. The Hilbert curve can also ensure relevance between pixels.

Substep 3: UPEMD is performed on the 1D data. With comparison on experimental results, a fifth intrinsic mode is most stable, and is also the best mode. Hence, the fifth intrinsic mode is selected as input data for PHT. Inverse Hilbert curve transform is performed on this intrinsic mode. The intrinsic mode is processed with a polar coordinate domain, and values in a unit circle are taken.

Substep 4: The values are partitioned into blocks according to M/2×M/2. The PHT is performed on each block to obtain a PHT moment. Following calculation is performed on the PHT moment.

$$Y_j = \sum_{i+3}^{i} X_i + N$$

Note: J and N are self-defined, the J is initially 3, the N is initially 45, the N belongs to a key, and N∈(0,100).

A calculated value is subjected to mean binarization, and stored as information XORed with the encrypted watermark image.

Substep 5: Encryption on the watermark image: The watermark image W(i, j) with a size of Y×Y is XORed with a binary encryption matrix k(i, j) obtained through the Tent map to obtain an encrypted watermark image BW(i, j). Initial values in the Tent map are set as follows: x=0.152, y=0.4. The watermark image is also encrypted through the Tent map.

Substep 6: An eigenvector V(i) of a medical image and the encrypted watermark image BW(i) obtained in Substep 4 and Substep 5 are XORed to obtain a binary logic sequence Key(i). The Key(i) is stored to a third-party server for subsequent watermark decryption.

(3) Watermark Extraction:

Substep 1: A host image is read, and a corresponding channel is selected according to a key for the watermark extraction. By this time, the key includes the channel selected previously from red, green, and red (RGB) channels for feature extraction.

Substep 2: The NSCT is performed on the channel selected according to the key. A low-frequency domain is selected, and transformed into 1D data through a Hilbert curve for the convenience of processing. Through dimensionality reduction, the calculation burden for data can be reduced. The Hilbert curve can also ensure relevance between pixels.

Substep 3: The UPEMD is performed on the 1D data, the inverse Hilbert curve transform is performed on a fifth intrinsic mode, the fifth intrinsic mode is processed with a polar coordinate domain, and values in a unit circle are taken.

Substep 4: The values are partitioned into blocks according to M/2×M/2. The PHT is performed on each block to obtain a PHT moment. Following calculation is performed on the PHT moment.

$$Y_j' = \sum_{i+3}^{i} X_i' + N$$

A calculated value is subjected to the mean binarization, and then XORed with the key Key(i) to obtain an encrypted watermark sequence for the inverse Hilbert curve transform.

Substep 5: Decryption on the watermark image: A processed PHT moment Y'(j) is XORed with the key Key(i) obtain a watermark sequence BW'(i), and the inverse Hilbert curve transform is performed to obtain a watermark image BW'(i, j).

(4) Watermark Decryption:

Substep 1: The decryption key $W_0$ obtained in the encryption is XORed with the encrypted watermark BW'(i, j) obtained in Substep 5 of Step (3) to obtain original watermark information.

Substep 2: The present disclosure provides the digital watermarking algorithm based on the Tent map, the NSCT and the UPEMD-PHT and the system. The NSCT and the UPEMD is adopted to ensure that the extracted image features are highly stable, and the PHT is adopted to ensure that the resultant image features exhibit strong geometric attack resistance, strong normal attack resistance, and strong hybrid attack resistance. So even if the image is heavily altered (e.g., various noises are added), the extracted first watermark image is identical to the stored second watermark image (namely, the original watermark), and the Normalized Cross-Correlation (NC) and Bit Error Rate (BER) may be used to determine whether the first watermark image and the second watermark image are identical. For example, when the NC value calculated by using the first watermark image and the second watermark image is greater than the first predetermined threshold, and the calculated bit error rate is less than the second predetermined threshold, the first watermark image and the second watermark image are identical. With the zero-watermarking technique, the present disclosure ensures the integrity of the image, solving the conflict between robustness and invisibility in the watermark embedding. Therefore, the present disclosure is highly practical in the field of information security. Moreover, the algorithm is applicable to other fields using the concept of the third party, adapting to practicality and standardization advocated by networks today.

The following description is made from the theoretical bases and test data:

1. NSCT

It is mainly intended to decompose a source image with a non-subsampled pyramid (NSP) to obtain a low-frequency sub-band and a high-frequency sub-band. The low-frequency sub-band is continuously decomposed with the NSP, while the high-frequency sub-band is decomposed with a non-subsampled directional filter bank (NSDFB), thereby obtaining sub-bands across different directions and scales. The NSCT replaces the downsampling of the directional filter in the Contourlet with the NSP structure and converts the downsampling of the directional filter into the NSDFB, making the algorithm translation-invariant to repair the pseudo-Gibbs effect in fused images.

2. UPEMD

The UPEMD makes use of a uniform-phase noise interference signal, and can mitigate modal splitting and residual noise in EMD. The algorithm is applied to image signals. Compared with audio information, details are observed more carefully. Hence, requirements on related parameters for the image signals are greatly varied from those for the audio signals. The amplitude and number of phases for the interference signal are key important parameters in the UPEMD.

Step 1: Uniform-Phase Interference for Generating Signal Copies:

An auxiliary sinusoidal signal w $(t; \theta_k) = \varepsilon \cos(2 t f_w t + \theta_k)$ is designed, where $\theta_k$ is uniformly distributed in $[0, 2\pi)$.

$n_p$ interference signals are generated:

$$y_k(t) = x(t) + w(t; \theta_k), k = 1, 2, \dots, n_p$$

Step 2: Multi-Level Decomposition:

A decomposition technique is set according to a signal length n:

$$n_{imf} = \log_2(n)$$

An interference frequency $f_w$ and an amplitude $\varepsilon$ are adjusted step by step. Each signal is decomposed according to a structure $T_w = 2^m$ of a dyadic filter bank.

A finally extracted IMF meets strict reconstruction conditions:

$$x(t) = \sum_{m=1}^{n_{imf}} c_m(t) + r(t)$$

3. PHT

Assuming that f(x, y)(x, y∈[1, k]) represents an image with a size of K×K, a linear combination of an n-order kernel function $H_{nl}(x, y)$ of the PHT with a repetition number l can be defined on the unit circle, namely:

$$f(x, y) = \sum_n \sum_l M_{nl} H_{nl}(x, y)$$

where $M_{nl}$ represents a PHT moment.

The PHT moment is a product of f(x, y) and $H_{nl}(x, y)$.

$$M_{nl} = \Omega \int_{x^2+y^2 \leq 1} f(x, y)[H_{nl}(x, y)] * dxdy$$

where $\Omega$ is a constant, and $[H_{nl}(x, y)]^*$ is a conjugate of $H_{nl}(x, y)$.

The kernel function of the PHT includes a radial component $R_n(r)$ and a circular component $e^{il\theta}$.

$$H_{nl}(x, y) = R_n(r)e^{il\theta}$$

The kernel function should meet the following orthogonal condition $$\iint_{x^2+y^2 \leq 1} H_{nl}(x, y)[H_{n'l'}(x, y)] * dxdy = \delta_{nn'} \delta_{ll'}$$

where $\delta$ serves as a Kronecker function, and is defined as $$\delta_{kk'} = \begin{cases} 1, & k = k' \\ 0, & k \neq k' \end{cases}$$

Actually, the PHT collectively refers to polar complex exponential transform (PCET), polar cosine transform (PCT), and polar sine transform (PST). Different orthogonal moments have different radial components. Radial components of the PCET, the PCT and the PST are $$R_n^E(r) = e^{i2\pi n r^2}, R_n^C(r) = \cos(\pi n r^2), \text{ and } R_n^s(r) = \sin(\pi n r^2),$$

respectively.

The above are defined in continuous domains. In actual application, the digital image is discretely represented. In this case, the PCET can be calculated as:

$$M_{nl}^E = \frac{1}{\pi} \sum_{s=0}^{K-1} \sum_{t=0}^{K-1} f(x_s, y_t)[H_{nl}^E(x, y)]^* \Delta x_s \Delta y_t$$

where $$x_s^2 + y_t^2 \leq 1, (x_s, y_t) = \left( \frac{2s+1-K}{K}, \frac{2t+1-K}{K} \right),$$

$$\Delta x_s = \Delta y_t = \frac{2}{K}, \text{ and } s, t \in \{0, 1, \ldots, K-1\};$$

and the PCET moment $$M_{ni}^E$$

and a kernal function thereof are used to reconstruct an image function, namely $$\hat{f}(x_s, y_t) = \sum_{n=-\infty}^{\infty} \sum_{i=-\infty}^{\infty} M_{ni}^E H_{ni}^E(x_s, y_t)$$

In the discrete domain, the calculation on the PCT moment and the PST moment, along with their corresponding image reconstruction equations, is similar to that on the PCET moment, and thus is omitted for the brevity.

4. Tent Map

A chaotic system refers to a deterministic system with seemingly random and irregular motions. Its behavior is uncertain, non-repeatable, and unpredictable, forming the chaos phenomenon.

The Tent map refers to a piecewise linear map in mathematics, and is named for the fact that its function graph resembles a tent. Besides, it is still a 2D chaotic map, and is widely applied to chaotic encryption systems (such as image encryption). Moreover, it is also frequently used to generate chaotic spreading spectrum codes, construct the chaotic encryption systems, and implement chaotic optimization algorithms.

The Tent map is defined as follows:

$$x_{n+1} = f(x_n) = \begin{cases} \dfrac{x_n}{\alpha}, & x_n \in [0, \alpha) \\ \dfrac{1-x_n}{1-\alpha}, & x_n \in [\alpha, 1) \end{cases}$$

where $\alpha \in (0, 1)$. The Tent map is the chaotic map in the parameter range, and has a uniform distribution function and desirable relevance. It is further to be noted that the Tent map and the logistic map are topologically conjugate. Within a viable range of the a, the system is in a chaos state. Particularly $\alpha=0.5$, the system exhibits a short cycle. Therefore, $\alpha=0.5$ is generally avoided. When this map is used, it is to be noted that the initial value x(n) of the system cannot be the same as the parameter $\alpha$ of the system. Otherwise, a periodic system, rather than the chaotic system, is formed.

EXAMPLE

Figure 4:
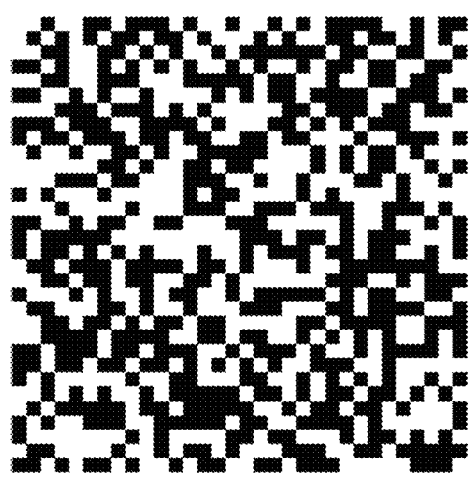
FIG. 4 illustrates an image encrypted through a Tent map.
Figure 5A:
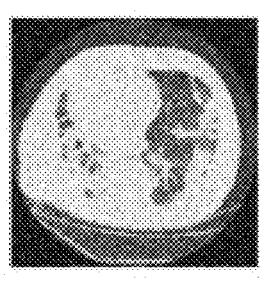
FIGS. 5A-5H illustrate host images upon an attack.
Figure 5B:
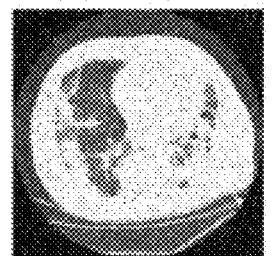
Figure 5C:
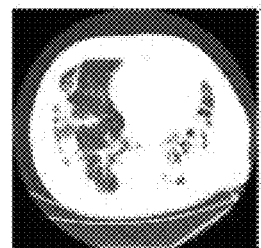
Figure 5D:
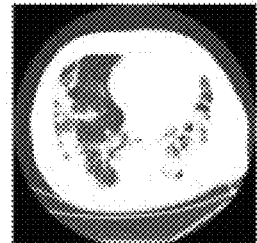
Figure 5E:
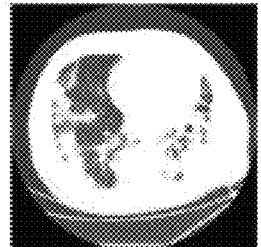
Figure 5F:
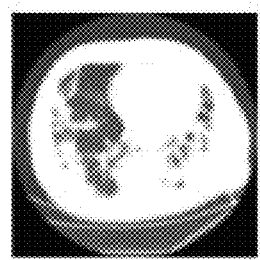
Figure 5G:
Figure 5H:
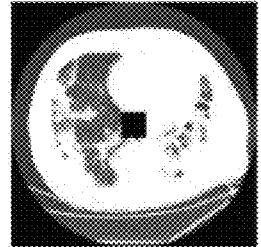
Figure 6A:
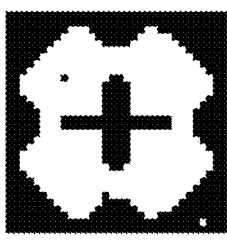
FIGS. 6A-6H illustrate extracted watermark images upon an attack.
Figure 6B:
Figure 6C:
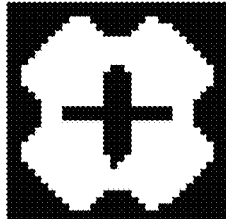
Figure 6D:
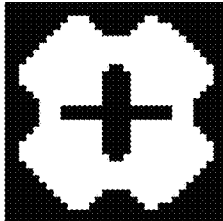
Figure 6E:
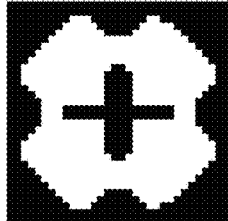
Figure 6F:
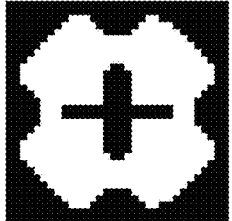
Figure 6G:
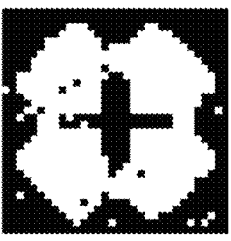
Figure 6H:
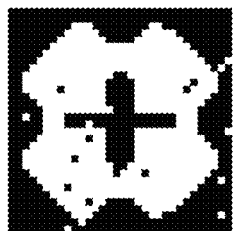

The host image with the size of 512×512 is tested in the experiment. The watermark image has a size of 32×32. The watermark image is encrypted first through the Tent map. FIG. 4 illustrates an encrypted image. As can be seen, the image changes significantly, it becomes so chaotic that the original content is almost unrecognizable, which preventing others from decrypting watermark information through correlation and thus improving the security greatly. Performance test is conducted on the watermarking solution in the present disclosure from robustness. The robustness is evaluated by applying a filtering attack, additive noise, a geometric attack, etc.

By applying different attacks to the watermark image and detecting a similarity between the extracted watermark and the original watermark, the robustness of the algorithm is verified. The robustness is evaluated by the NC and the BER. These attacks are classified into Gaussian noise, Salt & Pepper noise, JPEG Compression, Median Filter, Mean Filtering, Gaussian Low-pass Filter, Rotation, and Cropping. Results in Table 1 illustrate NCs upon the attack

TABLE 1

| Robustness test | |
| --- | --- |
| Attacks | NC(BER) |
| Gaussian noise (0.1) | 0.9981(0.0020) |
| Salt & Pepper noise (0.1) | 0.9990(0.0009) |
| JPEG compression (20) | 0.9990(0.0009) |
| Median Filter 3 × 3 | 1.0000(0.0000) |
| Mean Filtering 3 × 3 | 1.0000(0.0000) |
| Gaussian Low-pass Filter 3 × 3 | 1.0000(0.0000) |
| Rotation 15° | 0.9732(0.0273) |
| Cropping 10% | 0.9932(0.0166) |

As can be seen from the experimental data in Table 1 and FIG. 6A to FIG. 6H, the watermarking algorithm can resist normal attacks, including Gaussian noise, Salt & Pepper noise, JPEG Compression, Median Filter, Mean Filtering, and Gaussian Low-pass Filter. It also exhibits good resistance against the geometric attacks.

What is claimed is:

1. A computer-implemented copyright protection method, comprising:

obtaining a first image to be subjected to copyright verification;

extracting watermark from the first image, comprising:

step 1: performing full-scale non-subsampled contourlet transform (NSCT) on the first image I(i, j) to obtain one first low-frequency sub-band and four first high-frequency sub-bands, I representing the first image;

step 2: performing Hilbert-curve dimensionality reduction on the first low-frequency sub-band to obtain a first one dimensional (1D) low-frequency sub-band;

step 3: for the first 1D low-frequency sub-band, decomposing a signal S'(t) of the first 1D low-frequency sub-band into different bands with wavelet packet decomposition (WPD), each band carrying a signal component, and determining a last intrinsic mode of the first 1D low-frequency sub-band after WPD;

step 4: performing inverse Hilbert-curve dimensionality augmentation on the last intrinsic mode of the first 1D low-frequency sub-band after WPD, subjecting to a polar coordinate domain transformation and extracting values in a unit circle to obtain a modal matrix X;

step 5: performing a polar harmonic transform (PHT) on the modal matrix X' to obtain a first PHT moment, and performing following calculation on the first PHT moment:

$$Y_j' = \sum_{i+3}^{i} X_i' + N$$

wherein $Y_j'$ is a processed PHT value, and $X_i'$ is an original value of an element of the first PHT moment; and step 6: subjecting a first processed PHT moment Y'(i, j) to mean normalization, followed by XORing with a stored key $W_y$(i, j) to obtain an encrypted watermark;

performing watermark decryption, comprising: XORing a stored decryption key $W_0$ and the encrypted watermark obtained in the step 6 to obtain a first watermark image;

comparing the first watermark image with a second watermark image stored and containing copyright information;

in response to a comparison result indicating that the first watermark image and the second watermark image are identical, determining that a copyright of the first image is legal.

2. The computer-implemented copyright protection method according to claim 1, wherein the decryption key $W_0$ is obtained by following steps:

generating a chaotic sequence from an initial value α, and followed by binarizing as X(j),X(j)|X(j)=1,0;

storing X(j),X(j)|X(j)=1,0 as a decryption key $W_0$.

3. The computer-implemented copyright protection method according to claim 2, wherein the stored key $W_y$(i, j) is obtained by following steps:

receiving the second watermark image containing the copyright information input by a user;

performing encryption on the second watermark image W(i, j) through a Tent map, comprising: XORing X(j),X(j)|X(j)=1,0 and the second watermark image to obtain an encrypted second watermark image $W_e$(i, j);

performing watermark embedding, comprising step 1: performing the full-scale NSCT on a second image I(i, j) input by the user to be subjected to copyright protection, to obtain one second low-frequency sub-band and four second high-frequency sub-bands, I representing the second image;

step 2: performing the Hilbert-curve dimensionality reduction on the second low-frequency sub-band to obtain a second one-dimensional (1D) low-frequency sub-band;

step 3: for the second 1D low-frequency sub-band, decomposing a signal S(t) of the second 1D low-frequency sub-band into different bands with the WPD, each band carrying a signal component, and determining a last intrinsic mode of the second 1D low-frequency sub-band after WPD;

step 4: performing the inverse Hilbert-curve dimensionality augmentation on the last intrinsic mode of the second 1D low-frequency sub-band after WPD, subjecting to a polar coordinate domain transformation and extracting values in a unit circle to obtain a modal matrix X;

step 5: performing the PHT on the modal matrix X to obtain a second PHT moment, and performing following calculation on the second PHT moment:

$$Y_j = \sum_{i+3}^{i} X_i + N$$

wherein $Y_i$ is a processed PHT value, $X_i$ is an original value of an element of the second PHT moment; and step 6: subjecting a second processed PHT moment Y(i, j) to the mean normalization, followed by XORing with the encrypted second watermark image $W_e$(i, j) to obtain the key $W_y$(i, j).

4. The computer-implemented copyright protection method according to claim 1, wherein the decryption key $W_0$, the key $W_y$(i, j), and the second watermark image containing the copyright information are stored in a trustworthy third-party library.

5. The computer-implemented copyright protection method according to claim 1, wherein in the step 5, for $$Y_j' = \sum_{i+3}^{i} X_i' + N$$

in a process of extracting watermark features and a method for processing the first PHT moment, N is initially 45.

6. A copyright protection device, comprising a processor and a memory storing instructions that, when executed by the processor, cause the copyright protection device to perform the computer-implemented copyright protection method according to claim 1.

7. The copyright protection device according to claim 6, wherein the decryption key $W_0$ is obtained by following steps:

generating a chaotic sequence from an initial value α, and followed by binarizing as X(j),X(j)|X(j)=1, 0;

storing X(j),X(j)|X(j)=1,0 as a decryption key $W_0$.

8. The copyright protection device according to claim 7, wherein the stored key $W_y$(i, j) is obtained by following steps:

receiving the second watermark image containing the copyright information input by a user;

performing encryption on the second watermark image W(i, j) through a Tent map, comprising: XORing X(j),X(j)|X(j)=1,0 and the second watermark image to obtain an encrypted second watermark image $W_e$(i, j);

performing watermark embedding, comprising step 1: performing the full-scale NSCT on a second image I(i, j) input by the user to be subjected to copyright protection, to obtain one second low-frequency sub-band and four second high-frequency sub-bands, I representing the second image;

step 2: performing the Hilbert-curve dimensionality reduction on the second low-frequency sub-band to obtain a second one-dimensional (1D) low-frequency sub-band;

step 3: for the second 1D low-frequency sub-band, decomposing a signal S(t) of the second 1D low-frequency sub-band into different bands with the WPD, each band carrying a signal component, and determining a last intrinsic mode of the second 1D low-frequency sub-band after WPD;

step 4: performing the inverse Hilbert-curve dimensionality augmentation on the last intrinsic mode of the second 1D low-frequency sub-band after WPD, subjecting to a polar coordinate domain transformation and extracting values in a unit circle to obtain a modal matrix X;

step 5: performing the PHT on the modal matrix X to obtain a second PHT moment, and performing following calculation on the second PHT moment:

$$Y_j = \sum_{i+3}^{i} X_i + N$$

wherein $Y_i$ is a processed PHT value, $X_i$ is an original value of an element of the second PHT moment; and step 6: subjecting a second processed PHT moment Y(i, j) to the mean normalization, followed by XORing with the encrypted second watermark image $W_e$(i, j) to obtain the key $W_y$(i, j).

9. The copyright protection device according to claim 6, wherein the decryption key $W_0$, the key $W_y$(i, j), and the second watermark image containing the copyright information are stored in a trustworthy third-party library.

10. The copyright protection device according to claim 6, wherein in the step 5, for $$Y_j' = \sum_{i+3}^{i} X_i' + N$$

in a process of extracting watermark features and a method for processing the first PHT moment, N is initially 45.

11. A non-transitory computer readable storage medium, wherein the storage medium stores instructions which, when executed, cause a computer to perform the computer-implemented copyright protection method according to claim 1.

12. The non-transitory computer readable storage medium according to claim 11, wherein the decryption key $W_0$ is obtained by following steps:

generating a chaotic sequence from an initial value α, and followed by binarizing as X(j),X(j)|X(j)=1, 0;

storing X(j),X(j)|X(j)=1,0 as a decryption key $W_0$.

13. The non-transitory computer readable storage medium according to claim 12, wherein the stored key $W_y$(i, j) is obtained by following steps:

receiving the second watermark image containing the copyright information input by a user;

performing encryption on the second watermark image W(i, j) through a Tent map, comprising: XORing X(j),X(j)|X(j)=1,0 and the second watermark image to obtain an encrypted second watermark image $W_e$(i, j);

performing watermark embedding, comprising step 1: performing the full-scale NSCT on a second image I(i, j) input by the user to be subjected to copyright protection, to obtain one second low-frequency sub-band and four second high-frequency sub-bands, I representing the second image;

step 2: performing the Hilbert-curve dimensionality reduction on the second low-frequency sub-band to obtain a second one-dimensional (1D) low-frequency sub-band;

step 3: for the second 1D low-frequency sub-band, decomposing a signal S(t) of the second 1D low-frequency sub-band into different bands with the WPD, each band carrying a signal component, and determining a last intrinsic mode of the second 1D low-frequency sub-band after WPD;

step 4: performing the inverse Hilbert-curve dimensionality augmentation on the last intrinsic mode of the second 1D low-frequency sub-band after WPD, subjecting to a polar coordinate domain transformation and extracting values in a unit circle to obtain a modal matrix X;

step 5: performing the PHT on the modal matrix X to obtain a second PHT moment, and performing following calculation on the second PHT moment:

$$Y_j = \sum_{i+3}^{i} X_i + N$$

wherein $Y_i$ is a processed PHT value, $X_i$ is an original value of an element of the second PHT moment; and step 6: subjecting a second processed PHT moment Y(i, j) to the mean normalization, followed by XORing with the encrypted second watermark image $W_e$(i, j) to obtain the key $W_y$(i, j).

14. The non-transitory computer readable storage medium according to claim 11, wherein the decryption key $W_0$, the key $W_y$(i, j), and the second watermark image containing the copyright information are stored in a trustworthy third-party library.

15. The non-transitory computer readable storage medium according to claim 11, wherein in the step 5, for $$Y_j' = \sum_{i+3}^{i} X_i' + N$$

in a process of extracting watermark features and a method for processing the first PHT moment, N is initially 45.

* * * * *